Nov. 7, 1967   D. J. MURPHY, JR   3,350,861
PARTICULATE FLUID TREATING FILTER ASSEMBLY
Filed March 30, 1966
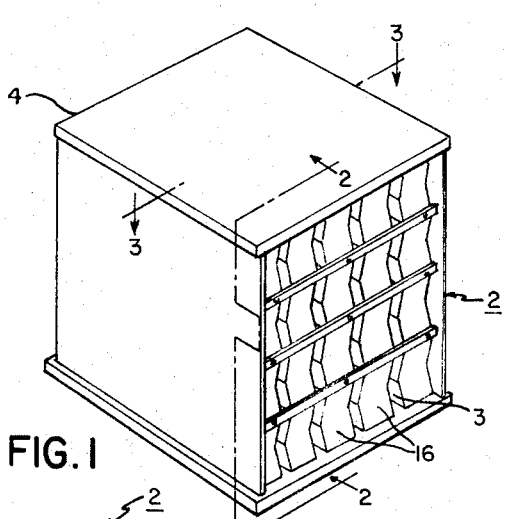
FIG.1
FIG.3
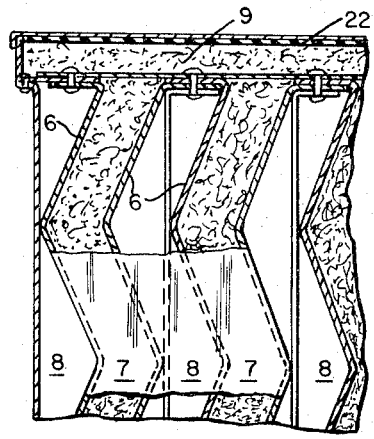
FIG.2
FIG.4
INVENTOR.
DAVID J. MURPHY, JR.
BY
Ralph B. Brick
ATTORNEY United States Patent Office 3,350,861
Patented Nov. 7, 1967

3,350,861
PARTICULATE FLUID TREATING
FILTER ASSEMBLY
David J. Murphy, Jr., Louisville, Ky., assignor to American Air Filter Company, Inc., Louisville, Ky., a corporation of Delaware
Filed Mar. 30, 1966, Ser. No. 538,700
5 Claims. (Cl. 55—484)

ABSTRACT OF THE DISCLOSURE

A particulate filter assembly including corresponding, side-by-side, zigzag chambers, alternate ones of which are filled with particulate filter materials, the particulate-filled chambers having a supply chamber in communication therewith immediately thereabove, with the chambers beeing spaced from each other by means of spaced support strips, and with the ends of the chambers being selectively covered so that the particulate filled chambers are closed at both ends and the unfilled chambers are successively open and closed along the upstream inlet and downstream outlet, respectively, in offset relation to permit the dirty gas to be treated to pass through the unit filter assembly through the particulate filled chambers.

The present invention relates to fluid filters and, more particularly, to a novel structural arrangement for a unit fluid treating filter assembly of the particulate type.

In accordance with the present invention, a fluid treating filter apparatus of the particulate type is provided which is economical in construction, assembly, operation and maintenance, requiring a minimum of parts, and yet, which is efficient in performance, providing a maximum of particulate filter medium to the fluid stream being treated. In addition, the present invention provides a fluid treating filter assembly which has sufficient strength and stability to withstand the intensive shock loads to which such type filter assemblies might be subjected. Further, the present invention, recognizing the problem of particulate packing with accompanying fluid stream bypass, provides an arrangement which assures that the fluid stream is exposed to particulate filter medium treatment fully at all times throughout operations.

Various other features of the present invention will become obvious to one skilled in the art upon reading the disclosure set forth hereinafter.

More particularly, the present invention provides a fluid-treating filter apparatus comprising a housing defining a gas treating plenum, the housing having an upstream dirty gas inlet and downstream clean gas outlet; a plurality of spaced, perforated plates disposed within the housing to extend between the dirty gas inlet and clean gas outlet substantially parallel the direction of gas flow through the housing, the plates being of corresponding zig-zag cross section to provide a plurality of side-by-side, nesting, zig-zag chambers extending longitudinally along the direction of gas flow; particulate filter means disposed in alternate ones of the side-by-side chambers to provide a set of particulate filled chambers alternating with a set of unfilled chambers; spacer-support strips extending transverse the chambers to abut against the crests of plates defining the chambers to maintain the plates in spaced relationship; and means to selectively cover opposite extremities of the side-by-side chambers with the set of particulate filled chambers being closed at both ends and the set of unfilled chambers being successively open and closed along the upstream inlet and downstream outlet, respectively, in offset relationship to permit the gas to be treated to pass through the dirty gas inlet, through the set of particulate filled chambers, and out the clean gas outlet.

In addition, the present invention provides a novel fluid filter supply reservoir above and in communication with the set of particulate filled chambers to insure a constant, full supply of particulate materials to the particulate chambers in the event undue packing of particulate material occurs.

It is to be understood that various changes can be made in the arrangement, form, and construction of the apparatus disclosed herein without departing from the scope or spirit of the present invention.

Referring to the drawing:

FIGURE 1 is an isometric view of one advantageous embodiment of a unit filter assembly incorporating the novel features of the present invention;

FIGURE 2 is a partial vertical sectional view on an enlarged scale taken in a plane passing through line 2—2 of FIGURE 1, further illustrating the nesting zig-zag chambers of the filter assembly of FIGURE 1;

FIGURE 3 is a horizontal sectional view of the apparatus of FIGURE 1 taken in a plane through line 3—3 of FIGURE 1, illustrating the gas flow path through the filter assembly; and FIGURE 4 is an enlarged, partially broken away isometric exploded view of the apparatus of FIGURE 1.

As can be seen from the drawing, the novel filter assembly includes filter housing 2 having a dirty gas inlet 3 and clean gas outlet 4. Housing 2 which serves to define a gas treating plenum can be made from any one of a number of suitable materials known in the art and, advantageously, a lightweight thin gauge aluminum or wood material can be utilized. Disposed within housing 2 to extend between dirty gas inlet 3 and clean gas outlet 4 are a plurality of spaced perforated plates 6. It is to be noted that in order to provide a maximum of gas treating area, plates 6 are of corresponding zig-zag cross section to provide a plurality of side-by-side nesting zig-zag chambers extending longitudinally along the direction of gas flow. It further is to be noted that alternate side-by-side chambers are filled with particulate filter material to provide a set of particulate filled chambers 7 alternating with a set of unfilled chambers 8. A horizontally-extending particulate filter supply reservoir 9 is disposed in housing 2 above and in communication with the set of particulate filter chambers 7 to supply a constant source of particulate filter material to chamber 7 as the material is packed down during extended periods of operation, thus insuring that the fluid stream to be treated is fully exposed to filter material at all times throughout operations. It is to be understood that any one of a number of suitable particulate filter materials can be utilized in the apparatus of the present invention and, advantageously, a suitable activated carbon particulate material has been found satisfactory.

As is recognized by the present invention, when the particulate filter material is inserted into chamber 7, considerable lateral stress is placed on the chamber defining plates 6 so as to distort the defined chambers and weaken the assembly. In accordance with the present invention, rigid spacer-support strips 11 are provided to extend transverse the unfilled chambers to abut against the crests of plates 6, maintaining the plates in preselected space relationship despite the lateral forces exerted thereon over extended periods of time. It is to be noted that spacer strips 11 are each provided with terminal support flanges 12 at their opposite extremities. In similar fashion, perforated plates 6 are provided with terminal support flanges 13 which extend at substantially right angles from the extremities thereof to support and space the plates in housing 2, rivets 15 joining the support flanges to a wall of housing 2 and a wall of chamber 9 within such housing.

To cover the opposite extremities of the side-by-side chambers so that particulate filled chambers 7 are closed at both ends and unfilled chambers 8 are successively open and closed along the upstream inlet and downstream outlet in offset relationship to permit the gas to be treated to pass through the dirty gas inlet and through chambers 7, sets of spaced upstream and downstream seal plates 16 and 17 respectively are provided. These seal plates are so arranged that the plates of one set 16 are offset laterally with respect to the plates 17 of the other to permit the gas stream flow as disclosed in FIGURE 3 of the drawings. To hold these sets in place, suitable tie bar frame assemblies 18 is provided. Tie bar frame assemblies 18, each include a plurality of spaced tie rods 19 which extend respectively through particulate filled chambers 7 to be fastened at either end of cross bar 19 to hold plates 16 and 17 in abutting engagement against the extremities of the selected chambers to be sealed. It further is to be noted that in order to insure that the particulate filter material in chamber 9 is constantly urged into the particulate chamber 7, a suitable sheet of resilient material 22 can be provided between the top of the housing above the chamber. Finally, it is to be noted that to prevent possible leakage at the bottom of the housing a seal sheet 23 of suitable sealing material such as pitch can be provided. The seal sheet in turn, can be covered by a force fit cover plate 24 which can be of the same material as the housing.

From the foregoing description, it can be seen that an economical unit filter structure is provided which can be readily assembled and maintained in operating condition with a minimum of effort and yet provide a maximum of filtering area to obtain efficient filtering performance.

The invention claimed is:

1. A fluid treating filter apparatus comprising: a housing defining a gas treating plenum, said housing having an upstream dirty gas inlet and downstream clean gas outlet; a plurality of spaces substantially rigid perforated plates disposed within said housing to extend substantially thereacross between said dirty gas inlet and clean gas outlet substantially parallel the direction of gas flow through said housing, said plates being of corresponding zig-zag cross section to provide a plurality of side-by-side, nesting, zig-zag chambers extending longitudinally along the direction of gas flow; particulate filter means disposed in and filling alternate ones of said side-by-side chambers to provide a set of particulate filled chambers alternating with a set of unfilled chambers; spaced apart thin spacer-support strips extending substantially thereacross and transverse said chambers to abut against the crests of the plates defining said chambers to maintain said plates in spaced relationship; and means to selectively cover opposite extremities of said side-by-side chambers so that said particulate filled chambers are closed at both ends and said unfilled chambers are successively open and closed along the upstream inlet and downstream outlet respectively in offset relation to permit the gas to be treated to pass through said dirty gas inlet, through said particulate filled chambers, and out said clean gas outlet.

2. The apparatus of claim 1, and a common particulate supply reservoir disposed in said housing above and in communication with said set of particulate filled chambers.

3. The apparatus of claim 1, said spacer-support strips extending across said unfilled chambers.

4. The apparatus of claim 1, said chamber forming plates having support flanges extending at substantially right angles from the extremities thereof to support and further space said plates in said housing.

5. The apparatus of claim 1, said means to cover said chamber extremities comprising sets of spaced upstream and spaced downstream seal plates with the seal plates of one set being offset with respect to the seal plates of the other; and tie bar frame means to hold said plates in abutting engagement against the extremities of selected chambers to be sealed.

References Cited

UNITED STATES PATENTS

| | | | |
|---|---|---|---|
| 178,103 | 5/1876 | Bracher | 55—521 X |
| 711,188 | 10/1902 | Stone | 55—484 X |
| 1,109,059 | 9/1914 | Glassford | 55—350 X |
| 1,835,475 | 12/1931 | Dorfan | 55—484 |
| 1,982,099 | 11/1934 | Hechenbleikner | 55—484 X |
| 2,055,774 | 9/1936 | Ray | 55—484 X |
| 2,130,107 | 9/1938 | Somers | 55—484 X |
| 2,658,583 | 11/1953 | Fitzgerald | 55—518 |
| 2,989,145 | 6/1961 | Goodloe | 55—521 X |
| 3,024,593 | 3/1962 | Houdry. | |
| 3,186,149 | 6/1965 | Ayers | 55—484 X |

FOREIGN PATENTS

| | | |
|---|---|---|
| 659,067 | 3/1963 | Canada. |
| 1,232,433 | 4/1960 | France. |
| 917,319 | 2/1963 | Great Britain. |

HARRY B. THORNTON, *Primary Examiner.*

D. TALBERT, *Assistant Examiner.*